United States Patent [19]

Johnson et al.

[11] 4,155,421
[45] May 22, 1979

[54] PLANAR AIR PALLET WITH IMPROVED PLENUM CHAMBER AIR DISPERSION MEANS

[75] Inventors: Raynor A. Johnson; William D. Fletcher, both of Newark, Del.

[73] Assignee: American Industrial Research, Inc., Newark, Del.

[21] Appl. No.: 829,105

[22] Filed: Aug. 30, 1977

[51] Int. Cl.$^2$ ............................................. B60V 1/04
[52] U.S. Cl. .................................... 180/125; 414/676
[58] Field of Search ................. 180/124, 125, 116; 214/1 BE

[56] References Cited

U.S. PATENT DOCUMENTS

| | | | |
|---|---|---|---|
| 2,918,183 | 12/1959 | Peterson | 180/125 |
| 3,276,222 | 10/1966 | Hutchinson | 180/125 X |
| 3,513,934 | 5/1970 | Crowley | 180/125 X |
| 3,513,935 | 5/1970 | Noble | 180/124 |
| 3,576,231 | 4/1971 | Jung | 180/124 |
| 3,610,364 | 10/1971 | Snoeyenbos | 180/124 |
| 3,762,335 | 10/1973 | Baker | 180/125 X |
| 3,834,556 | 9/1974 | Crimmins | 180/125 X |
| 3,921,752 | 11/1975 | Gregg | 180/125 |
| 3,948,344 | 4/1976 | Johnson | 180/124 |

*Primary Examiner*—Joseph F. Peters, Jr.
*Assistant Examiner*—Terrance L. Siemens
*Attorney, Agent, or Firm*—Sughrue, Rothwell, Mion, Zinn and Macpeak

[57] ABSTRACT

A planar air pallet supports a load for frictionless transport on a backing member which overlies a fixed support surface. The pallet employs at least one sheet of flexible plastic film underlying the load and backing member and overlying the support surface and being perforated except for the perimeter to effect controlled pillowing of that flexible plastic film sheet and carries external air dispersion elements such as slats, ribs or strips. The dispersion element may take the form of a thin piece of cardboard to the side of the load adjacent the air inlet to the plenum chamber and may comprise a folded over portion of a generally rigid planar sheet forming a fixed support surface.

6 Claims, 5 Drawing Figures

PLANAR AIR PALLET WITH IMPROVED PLENUM CHAMBER AIR DISPERSION MEANS

BACKGROUND OF THE INVENTION

1. Field of the Invention

This invention relates to air pallets for frictionless material handling and more particularly to an air pallet of low cost construction which incorporates improved air dispersion means for the air under pressure directed to the plenum chamber.

2. Description of the Prior Art

Air pallets for material handling have come into vogue, as evidenced by U.S. Pat. No. 3,948,344 issuing Apr. 6, 1976, assigned to the same assignee as this application. The present invention is directed to improved air dispersion means which may be incorporated preferably externally of the plenum chamber to facilitate the jacking of air under light pressure internally of the air pallet and within the plenum chamber provided thereby. In the referred to patent, the air pallet permits frictionless movement of a load supported on the support surface. The air pallet constitutes an essentially rigid planar backing surface which could be the load itself with the load uniformly distributed over that surface. The pallet employs a flexible thin sheet which directly underlies the backing surface and directly overlies the fixed support surface. The portion of the flexible thin sheet facing the generally planar fixed support surface is perforated, with the exception of a perimeter portion, to a desired height, to achieve sheet pillowing upon the application of air pressure within the plenum chamber defined by the thin sheet and the backing surface. The provision of air dispersion means is required for the air pallet to insure air flow from a localized inlet or hole within the plenum chamber wall throughout the chamber and to effect jacking of the load and chamber pressurization. The means for controlling pillowing of the chamber is necessary to permit the air pallet to accommodate surface irregularities for both the load support and the backing surface and without sheet ballooning, that is, achieving a spherical shape with resultant tilting and loss of the load carried on the load carrying backing surface.

The air dispersion means provided within the embodiments of the air pallet of our prior patent are formed within the chamber and take the form of spaced projections or strips mounted to the backing surface or to the flexible thin sheet or formed integrally therewith, or by way of a separate planar member such as a cardboard sheet or planar sheet with surface projections thereon. In this fashion, the application of low pressure air to the inlet to the chamber causes air distribution throughout the chamber even though the load applied to the air pallet presses the flexible thin sheet carrying the perforations tightly between the planar backing surface and the load support surface. By the incorporation of the means for controlling pillowing, initially no air is permitted to escape the plenum chamber, but as the load is jacked upwardly, the perforations closest to the perimeter or periphery of the flexible thin sheet are raised from the underlying fixed pallet and load support surface, and the air discharging through the perforations directly escapes therefrom. An air film is set up between the flexible sheet and the fixed support surface, constituting an air cushion to permit the frictionless movement of the pallet and its load relative to that fixed support surface.

The flexible thin sheet may constitute a bag which in turn carries internally a planar member forming the air dispersion means and in fact the load itself may form the rigid backing surface.

Alternatively, the flexible thin sheet may be heat sealed or otherwise bonded about its periphery to a generally rigid, planar backing member such as a cardboard sheet of a size similar to that of the flexible thin sheet carrying the perforations and underlying that backing and load carrying member.

SUMMARY OF THE INVENTION

The present invention is directed to an air pallet of this general construction in which preferably the air dispersion means is formed externally of the plenum chamber but has the effect of controlling the dispersion of air within that chamber to complete the pressurization of the chamber, the jacking of the load to the extent controlled by the pillowing means in a simplified and low cost manner.

In one specific form, the means defining the planar backing surface for carrying the load comprises a generally rigid planar sheet such as cardboard which is reversely bent along at least one end to preferably embrace an edge of the thin flexible sheet which underlies that member and which flexible sheet is perforated to form with the generally rigid planar sheet the pallet air plenum chamber. The generally rigid planar sheet carries the air inlet means at the fold with the folded portion terminating adjacent the inlet hole to form a vertical gap between the flexible thin sheet, at the air inlet hole to initiate the dispersion of air from the hole into the plenum chamber to the side of the pallet opposite that of the generally rigid planar sheet underlying fold. A recess may be formed within the underlying fold portion of the generally rigid planar sheet and aligned with the air inlet hole, to define air dispersion means for the pallet. The underlying fold portion of the generally rigid planar sheet may further include projections to each side of the recess which extend toward the plenum chamber from the edge of that fold portion, thereby spacing the flexible thin sheet from the fixed support surface in that area to form part of the air dispersion means of the air pallet. The thin flexible sheet and the generally rigid planar sheet may be extended at one end outside of the load area and are sealed together at their edges to define an air inlet passage leading to the plenum chamber and either the thin flexible sheet or the generally rigid planar sheet may carry, internally or externally, a slat or rib which spans across the area of demarcation between the inlet passage and the plenum chamber and internally of that chamber to deflect the low pressure air to both sides of the plenum chamber as it enters the same.

DESCRIPTION OF THE PREFERRED EMBODIMENTS

Figure 1:
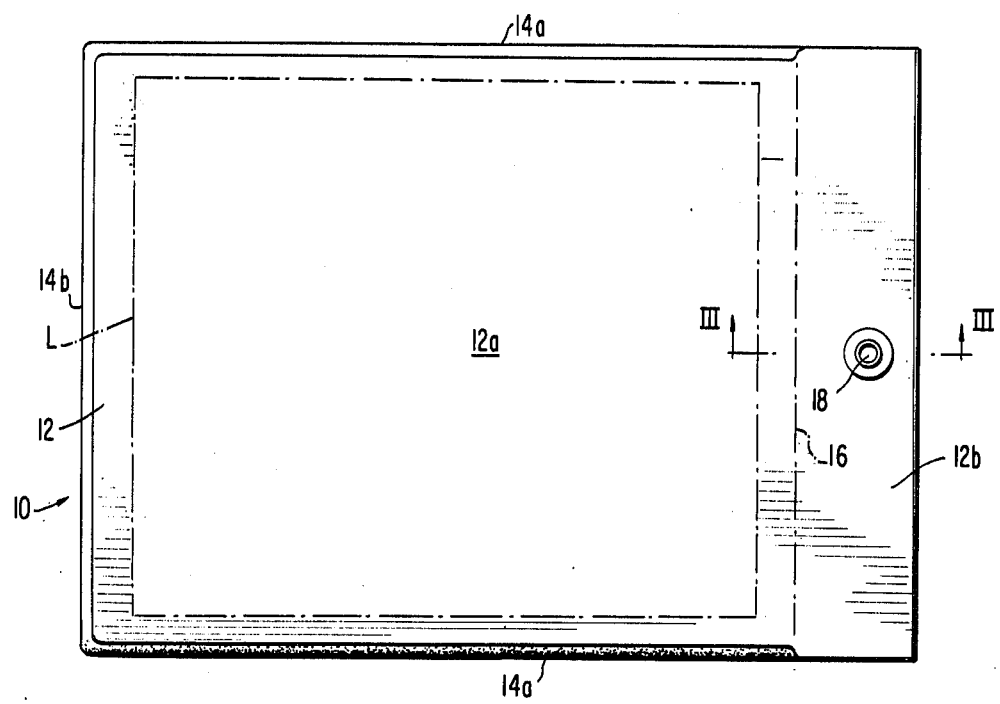
FIG. 1 is a top plan view of one embodiment of the flexible, thin sheet air pallet of the present invention with improved air dispersion means.
Figure 2:
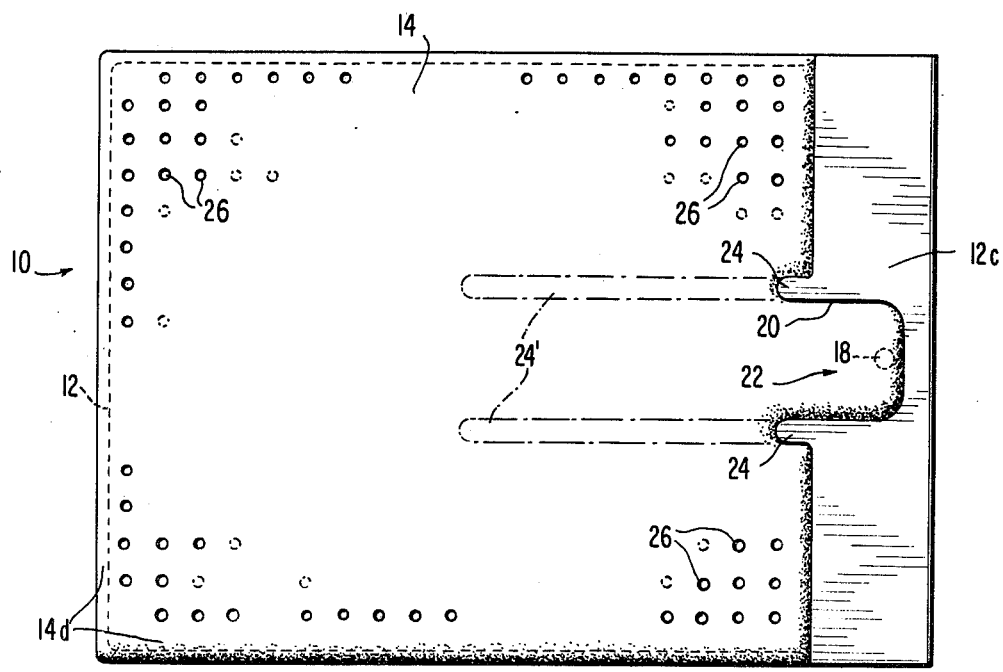
FIG. 2 is a bottom plan view of the air pallet of FIG. 1.
Figure 3:
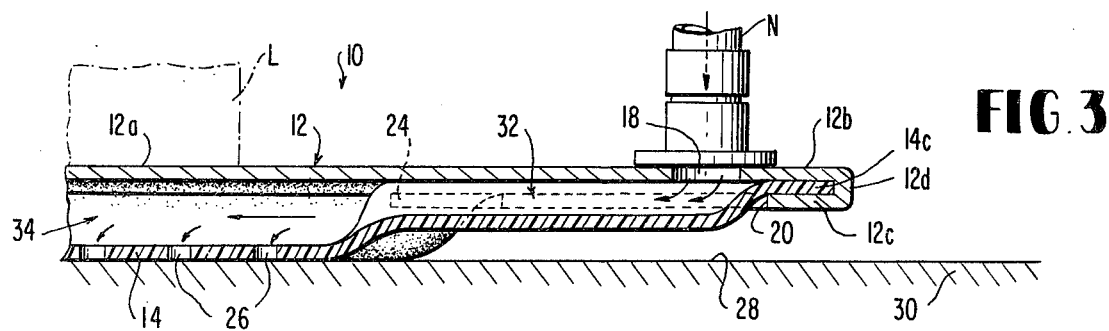
FIG. 3 is a sectional view of the air pallet of FIG. 1 taken about line III — III of FIG. 1.

Reference to FIGS. 1-3 inclusive shows one embodiment of the improved flexible thin sheet air pallet of the present invention. The air pallet, which is indicated generally at 10, is rectangular in form and comprises in this embodiment, an imperforate, generally rigid, planar sheet 12 which may be made of cardboard. The second principal component thereof comprises a flexible thin sheet 14 which may be of a suitable plastic. The sheet 12 defines the top of the air pallet while sheet 14 defines the bottom with the sheet 12 constituting a generally rigid, planar backing surface for supporting a load such as L thereon, FIG. 3, which overlies the portion 12a of sheet 12 forward of load line 16, FIG. 1. The air pallet 10 and the load L carried by the same rest upon a planar fixed support surface such as surface 28 provided by flooring 30. The thin flexible sheet 14 directly underlies the backing surface and directly overlies the load support surface 28. While the flexible thin sheet 14 may take the form of a layer of an open ended bag within which the generally rigid sheet 12 may be inserted, in the embodiment shown in FIGS. 1-3, the sheet 14 is rectangular in form, conforming dimensionally to that of the generally rigid sheet 12, but having a length and width slightly greater such that edges 14a and 14b at the forward end of the pallet, FIG. 1, are adhesively or thermally bonded or otherwise sealably affixed to the perimeter of the generally rigid sheet 12.

In this construction of the air pallet, the embodiment of the invention is characterized by the generally rigid sheet 12 having a reversely bent, underlying portion of flap 12c at the head end of the pallet and which underlies portion 12b to one side of the load line 16, opposite portion 12a which carries load L. The generally rigid sheet 12 is bent at 12d. Portion 12b of the generally rigid sheet, on top of the pallet, is provided with a central hole or aperture as at 18 constituting the air inlet, permitting the insertion of an air hose nozzle N for supplying air from a suitable source (not shown). Such source may consist of an air blower of the type manufactured and sold by Stihl American, Inc., of Midland Park, New Jersey, under Model Designation STIHL SG17 and providing low pressure air of approximately 380 cubic feet per minute and being powered by a single cylinder two cycle engine. The air inlet or hole 18 opens to the flexible thin sheet 14, one end of that sheet being essentially sandwiched by the portions 12b and 12c of the generally rigid sheet 12 and being sealed thereto. The flexible sheet 14 and generally rigid sheet 12 define a plenum chamber 34 by way of the sealed edges 14a, 14b and at 14c of the flexible thin sheet 14 and the generally rigid planar sheet 12.

In the illustrated embodiment of FIGS. 1-3, the underlying reversely bent portion 12c of the generally rigid sheet 12 is provided with a U-shaped recess 22 within edge 20 which is aligned with and directly underlies the air inlet 18. This permits in spite of the application of load L to the air pallet a slight air gap or space as at 32 leading to the plenum chamber 34. The recessed edge flap of reversely bent portion 12c of the generally rigid sheet 12 constitutes air dispersion means for dispersing air into the plenum chamber 34.

Further, it may be seen in FIG. 3, that, in spite of the presence of the load L, there is a gap G between the load support surface 28 and the flexible thin sheet 14 further permitting that thin flexible sheet 14 to move away from the generally rigid sheet 12 to facilitate the movement of air into the plenum chamber. Thus, the short length portion 12c of the generally rigid sheet 12 may constitute air dispersion means in and of itself, assuming that it terminates at or adjacent to inlet 18 leading to the plenum chamber.

In line with the air pallet of our earlier patent, the flexible thin sheet 14 is provided with a perimeter portion 14d which is imperforate, while the center of that same sheet underlying load L carries preferably a regular pattern of small diameter holes or perforations 26 which create an overall air cushion by the escape of air from the plenum chamber 34 upon pressurization, pillowing and jacking of the load in accordance with the principles outlined in our prior patent, which is fully incorporated herein by reference.

Additionally, as shown in FIG. 2, there may be provided strip-like projections 24 projecting outwardly and away from edge 20 of the rigid sheet portion 12c to each side of the recess 22, these projections facilitating passage of air from the inlet or hole 18 into the plenum chamber 34. The projections or strips may be of varying length and may, as shown in dotted form at 24', extend more than half way across the length of the plenum chamber. In the illustrated embodiment, the upper, generally rigid sheet 12 may be approximately 56 inches in length and 40 inches in width with a load line 48 inches from the end of the sheet bearing edge 14b of the flexible thin sheet 14, that is, adjacent the head end of the planar air pallet. The perforated, flexible thin sheet 14 may comprise a sheet of plastic material folded at its edges to the top side of the generally rigid sheet 12 and may be attached by heat sealing, tape, or the like, to mechanically affix the same and effect an air tight seal between sheets 12 and 14.

Absent the recess 22 formed by cutting out a portion of the bent under cardboard generally rigid sheet 12, the portion may include protrusions such as strips aligned to each side of the air inlet 18, it being necessary to in some fashion space the foil or flexible thin sheet 14 from the generally rigid sheet 12 and act to lift the flexible thin sheet 14 and the backing sheet 12 slightly off the surface of the floor at that point, thereby permitting air under light pressure to fill the area and to progressively lift the generally rigid sheet 12 relative to the flexible thin sheet 14 and jack the load to the point where air starts to escape freely from those perforations 26 exposed to the air at the perimeter of the assembly after suitable pillowing. Pillowing provides a height to the plenum chamber such that when the flexible sheet meets a surface irregularity, particularly a projection which projects upwardly from the floor or load bearing surface 28, it will simply side over that surface without the rigid sheet 12 contacting the same. The flexible thin plastic sheet 14 may comprise a plastic film such as polypropylene or polyvinyl chloride and in a simplified structure, particularly for "throw away" use, the sheet material may be essentially that employed in the manufacture of conventional plastic "garbage" bags.

Figure 4:
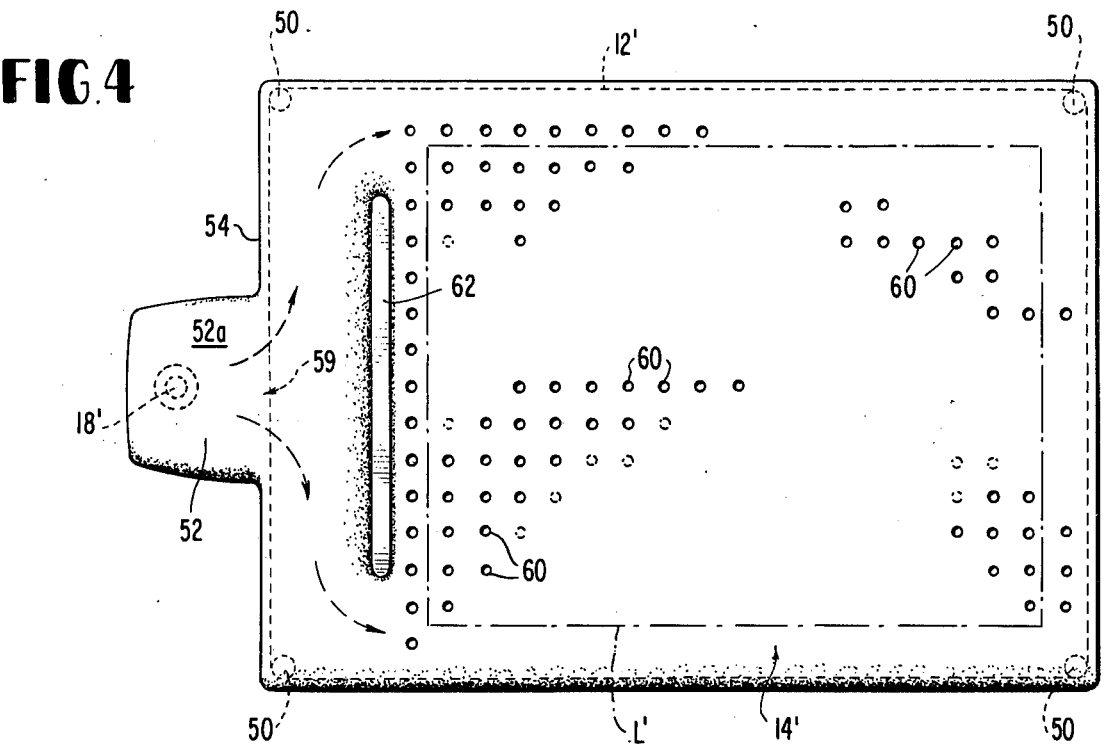
FIG. 4 is a bottom plan view of a second embodiment of the flexible thin sheet air pallet of the present invention.
Figure 5:
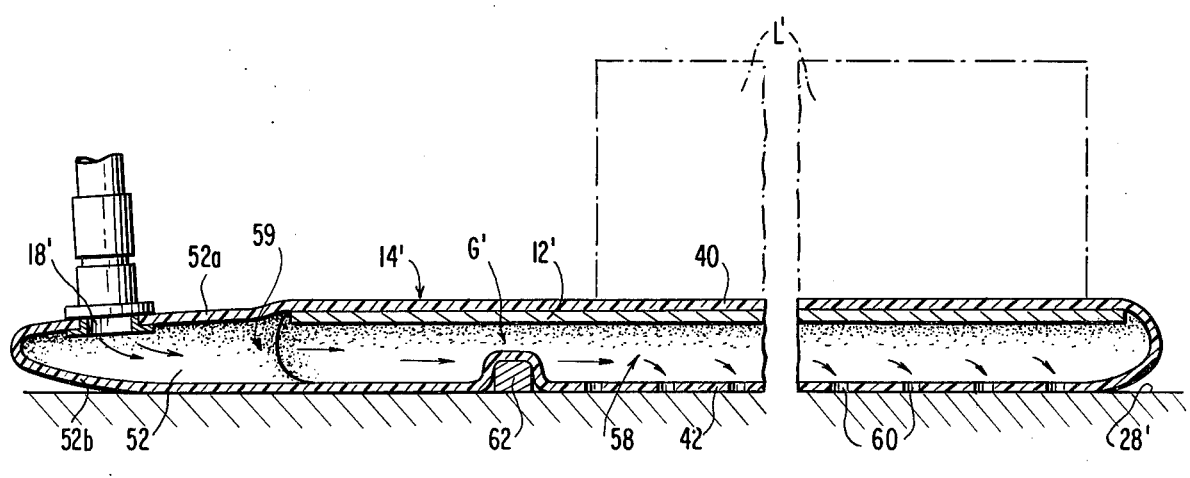
FIG. 5 is a sectional view of the embodiment of FIG. 4.

Referring next to FIG. 4, an alternate embodiment of the invention is shown wherein the load L' shown in dotted form rests upon the generally rigid sheet 12'. In the illustrated form, the thin flexible sheet comprises one wall of a complete bag as at 14' within which is carried the generally rigid sheet 12'. The bag 14' includes an upper wall 40 and integral wall 42, being heat sealed at the four corners as at 50 to the inserted sheet 12. The bag is characterized by an integral, narrow air inlet chamber 52 at its head end which acts as an extension of edge 54 of bag 14'. It is formed of two walls, that is, an upper wall 52a and a lower wall 52b, the walls being heat sealed at their perimeters to form the air inlet chamber 52. One of the walls such as 52a is provided with an air inlet opening 18'. Further, the air inlet chamber 56 opens to the plenum chamber 58 defined by lower wall 42 of the bag 14' and the generally rigid sheet 12'. Air enters the space between lower sheet 42 and rigid sheet 12'. In this respect, in the illustrated embodiment of FIGS. 4 and 5, the bag forming the thin flexible sheet facing the load support surface and bearing the perforations as at 60, carries a single strip 62 which may be integral or separate and thermal welded or otherwise adhesively bonded to the outer surface of the bag wall 42. Strip 62 faces the opening 59 leading from the air inlet chamber 52 to the plenum chamber 58 but is spaced from that opening such that the air tends to be diverted to each side of the strip 62. Strip 62, therefore, constitutes the air dispersion means for this embodiment of the invention. As may be seen in FIG. 5, the presence of the load L' causes the generally rigid sheet 12 to press the lower bag layer or sheet against the fixed load support surface 28' but the pressure of strip 62 raises that portion immediately adjacent the strip 62, whereby a small gap G' is provided between opening 59 between the main bag 14' and its portion 52 forming the air inlet chamber to the main plenum chamber 58.

Again, the perimeter of the bag wall 42 is free of perforations to permit pillowing of that portion of the bag which extends about the generally rigid sheet 12' to the extent of jacking up the load L' to the extent that some of the perforations are directly exposed to the atmosphere, while others bleed air between the perforated lower bag surface and the fixed surface 28', defining an air cushion or air bearing for the load and pallet. Additional slats, ribs or the like may be integral with and/or fastened to the bag. Such elements may comprise pieces of cardboard or corrugated board similar to that forming the generally rigid sheet 12'; they may be spaced from and at right angles to strips 62. For instance, strips could extend along all four edges of the assembly intermediate of the bonding points 50 for the bag and sheet formed pallet 10'.

The operation of the various embodiments of the present invention is in conformance with the operation set forth in our prior U.S. Pat. No. 3,948,344. Air clamps may be employed both for mechanically gripping the air pallet for pulling or pushing the load carried thereby and also for supplying air under low pressure to the plenum chamber to create the air cushion or air bearing after jacking the load to the extent of the pillowing means.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An air pallet for frictionless movement of a load supported thereon relative to an underlying generally planar fixed support surface and wherein said air pallet comprises a generally rigid, planar backing surface for supporting said load, a thin flexible sheet directly underlying said backing surface and directly overlying the load support surface and having that portion facing said generally planar fixed support surface perforated and defining with the backing surface a plenum chamber with said perforations unrestrictedly opening directly to the plenum chamber and wherein said air pallet includes air dispersion means to insure air flow throughout the chamber when the pallet is under load and subject to air pressurization, air inlet means to the chamber for permitting air under pressure to enter the chamber for jacking the load and for discharge through the perforations, and means for controlling pillowing of the flexible sheet portion of the chamber to jack the backing surface and the load sufficiently to permit the pallet to accommodate surface irregularities for both said load support surface and said backing surface without ballooning, the improvement wherein: said air dispersion means comprises at least one member external of said chamber and adjacent said air inlet means; said generally rigid backing surface comprises a second, generally rigid planar sheet, said thin flexible sheet is in the form of a single layer and is sealably fixed at its edges to the edges of said second sheet about at least three sides thereof, and said second sheet is folded under at one end to embrace one end of said thin flexible sheet, said air inlet means comprises a hole within said second sheet in the vicinity of said folded under portion of said second sheet and said folded under portion terminates adjacent said hole and forms said air dispersion means, and wherein a recess is formed within the edge of said folded under portion of said second sheet facing towards said plenum chamber, said recess being aligned with the underlying said air inlet means such that said thin flexible sheet is spaced from said planar fixed support surface and forms an air inlet passage at said recess leading from said hole within said second sheet to said plenum chamber.

2. The air pallet as claimed in claim 1, wherein said folded under portion of said planar sheet comprises integral projections to each side of said hole extending in the direction towards said plenum chamber to cause said thin flexible sheet to be spaced from said planar fixed support surface at least to the extent of the length of that material intermediate of said projection.

3. An air pallet for frictionless movement of a load supported thereon relative to an underlying generally planar fixed support surface and wherein said air pallet comprises a generally rigid, planar backing surface for supporting said load, a thin flexible sheet directly underlying said backing surface and directly overlying the load support surface and having that portion facing said generally planar fixed support surface perforated and defining with the backing surface a plenum chamber with said perforations unrestrictedly opening directly to the plenum chamber and wherein said air pallet includes air dispersion means to insure air flow throughout the chamber when the pallet is under load and subject to air pressurization, air inlet means to the chamber for permitting air under pressure to enter the chamber for jacking the load and for discharge through the perforations, and means for controlling pillowing of the flexible sheet portion of the chamber to jack the backing surface and the load sufficiently to permit the pallet to accommodate surface irregularities for both said load support surface and said backing surface without ballooning, the improvement wherein: said means for forming a generally rigid planar backing surface comprises a first generally rigid sheet, and wherein a thin flexible bag receives said rigid sheet to form said plenum chamber underlying said rigid sheet, said load is supported on that portion of the bag overlying said rigid sheet, and wherein said bag includes an extension portion which projects outwardly to the perimeter of said rigid sheet, is sealed thereto and opens to said plenum chamber such that said extension portion constitutes an air supply chamber, said air inlet means comprises an opening within one wall of said bag extension portion such that said bag extension portion, outside of the load area, comprises air dispersion means by ready air supply chamber expansion upon air entry into said air inlet, even when the load presses the bag and the rigid sheet against the planar fixed support surface, the portion of the thin flexible bag adjacent said extension portion is spaced from that planar fixed support surface to permit air entering the plenum chamber from the bag extension portion to be dispersed within the plenum chamber.

4. The air paller as claimed in claim 3, wherein said air dispersion means further comprises a protrusion on the outer surface of said bag within the perimeter portion thereof and between the perforations and the edge of the bag from which the bag extension projects.

5. An air pallet for frictionless movement of a load supported thereon relative to an underlying generally planar fixed support surface and wherein said air pallet comprises a generally rigid, planar backing surface for supporting said load, a thin flexible sheet directly underlying said backing surface and directly overlying the load support surface and having that portion facing said generally planar fixed support surface perforated and defining with the backing surface a plenum chamber with said perforations unrestrictedly opening directly to the plenum chamber and wherein said air pallet includes air dispersion means to insure air flow throughout the chamber when the pallet is under load and subject to air pressurization, air inlet means to the chamber for permitting air under pressure to enter the chamber for jacking the load and for discharge through the perforations, and means for controlling pillowing of the flexible sheet portion of the chamber to jack the backing surface and the load sufficiently to permit the pallet to accommodate surface irregularities for both said load support surface and said backing surface without ballooning, the improvement wherein: a thin flexible bag forms said plenum chamber underlying said rigid planar backing surface, said load is supported on that portion of the bag overlying said rigid planar backing surface, and wherein said bag includes an extension portion which projects outwardly of the perimeter of said rigid planar backing surface, is sealed thereto and opens to said plenum chamber, such that said extension portion constitutes an air supply chamber, said air inlet means comprises an opening within one wall of said bag extension portion such that said bag extension portion, outside of the load area, comprises air dispersion means by ready air supply chamber expansion upon entry of air into said inlet, even when the load presses the bag against the rigid planar backing surface, the portion of the thin flexible bag adjacent said extension portion is spaced from said planar backing surface to permit air entering the plenum chambeer from the bag extension portion to be dispersed within the plenum chamber.

6. The air pallet as claimed in claim 5, wherein said air dispersion means further comprises a protrusion on the outer surface of said bag within the perimeter portion thereof and between the perforations and the edge of the bag from which the bag extension projects.

* * * * *